United States Patent [19]
Congdon et al.

[11] Patent Number: 6,151,297
[45] Date of Patent: Nov. 21, 2000

[54] METHOD AND SYSTEM FOR LINK LEVEL SERVER/SWITCH TRUNKING

[75] Inventors: Paul Congdon, Granite Bay; Brian Krelle, Roseville, both of Calif.

[73] Assignee: Hewlett-Packard Company, Palo Alto, Calif.

[21] Appl. No.: 08/889,317

[22] Filed: Jul. 8, 1997

[51] Int. Cl.[7] .................................................. H04J 3/24
[52] U.S. Cl. ................................................ 370/216
[58] Field of Search .................................. 370/338, 254, 370/255, 386, 392, 231, 216, 217, 218, 219, 229, 230, 235, 419, 420, 401, 465, 466, 468, 471, 473, 475, 477, 389, 395, 351, 352, 403, 404, 285, 293, 340, 347, 341, 220, 227, 228, 408, 407, 406, 256, 278, 252; 395/650, 675; 340/825.01, 825.03

[56] References Cited

U.S. PATENT DOCUMENTS

| | | | |
|---|---|---|---|
| 5,025,491 | 6/1991 | Tsuchiya et al. | 370/255 |
| 5,241,677 | 8/1993 | Naganuma et al. | 395/675 |
| 5,271,003 | 12/1993 | Lee et al. | 370/392 |
| 5,740,157 | 4/1998 | Demiray et al. | 370/219 |
| 5,864,535 | 1/1999 | Basilico | 370/392 |
| 5,933,584 | 8/1999 | Maniwa | 395/114 |
| 5,968,126 | 10/1999 | Elkstrom et al. | 370/409 |
| 5,978,951 | 11/1999 | Lawler et al. | 370/392 |

*Primary Examiner*—Dang Ton

[57] ABSTRACT

A method and system are provided for trunking multiple links between a switch and a server. Server drivers recognize and automatically configure additional installed network interface cards (NICs) or multi-port NICs as group members. A monolithic driver, or an overlaying driver shim makes the group of NICs appear to be a single NIC to the server operating system and clients. Multiple NICs having the same MAC address and appearing on different ports are connected directly to a switch which treats the group as a single logical port. Using a deterministic algorithm, the switch looks up a received packet's destination in the address table. A list of possible ports for reaching the server and a flag indicating that the server is to be reached via this trunked group of ports are retrieved. The switch selects a port based upon the packet's source address. On the trunk to the clients, the server driver performs the same deterministic algorithm on the destination addresses. The invention supports fault tolerance. In one embodiment, a single switch is connected to a server via multiple NIC links. In another embodiment, the server is connected via multiple NIC links to a plurality of switches. To mitigate effects of the same source MAC address appearing on packets received from multiple ports in a group, the switch is notified that it is acceptable to see the server's MAC address appearing on several ports and is directed not to notify the system operator thereof.

31 Claims, 5 Drawing Sheets

METHOD AND SYSTEM FOR LINK LEVEL SERVER/SWITCH TRUNKING

BACKGROUND OF THE INVENTION

1. Technical Field

The invention relates to networked computer systems. More particularly, the invention relates to a method and system, including a failover system, for trunking multiple links between a switch and a server.

2. Description of the Prior Art

As the use of networked computer systems increases, the need has arisen to provide additional bandwidth to handle the electronic traffic on the network. For example, inadequate bandwidth can result in data stalling in the pipeline between a client and a server. This stalling can significantly limit network performance.

Network interface cards (NIC) are the attachments that are used to connect a server or any computing device to a network. Such NICs include, for example, Ethernet cards or Token Ring cards that plug into a desktop computer or server. The NIC implements the physical later signaling and the Media Access Control (MAC) for a computer attached to a network. Adding additional NICs to a computer effectively attaches the computer to a network multiple times. This increases the potential bandwidth into the network proportionally.

Load balancing is a technique used to reduce data bottlenecks caused by an overloaded communications network. In load balancing, the traffic between a server and a network over multiple NICs is balanced. Such load balancing typically requires software and a bridge or Ethernet switch between the server and client(s). Load balancing software, such as BALANCE.NLM from Network Specialists, Inc. of Lyndhurst, NJ and SWITCH.NLM from Kalpana of Sunnyvale, CA, is available in the form of a NetWare loadable module (NLM). This software is used for servers running Novell, Inc. NetWare NOS software.

Load balancing also provides fault tolerance, which maintains data communication between the server and the network in the event of a disruption in a data link. In a "failover" system, for example, a secondary link takes over the load if the primary link fails, such that signal continuity is maintained.

FIG. 1 is a schematic diagram of a failover system 10 according to the prior art, in which data are transmitted between the server 12 and clients 22 via a generic switch 24. Multiple links 18, 20 connect the switch to the server 12. Software drivers 16 control the transmission of data to and from the server over these links. If, for example, a NIC or network cable fails, traffic between the server and the network is passed to other functioning connections. Each NIC has an associated MAC address which is required for the NIC to receive packets on the network. In FIG. 1, the NICs for links 18 and 20 each have different MAC addresses, designated "A" and "A'." Only one of these NICs is active at a time. No clients are attached to the standby NIC (A'). Thus, if the primary NIC (A) fails, the standby NIC assumes its address in accordance with the server protocol 14.

"Trunking" is another scheme for increasing bandwidth to the server. FIG. 2 is a schematic diagram of a trunking system 28 according to the prior art, in which data are transmitted between the server and the clients 22 via a generic switch 24. Trunking is used with multiple server/network interfaces. In FIG. 2, multiple links 18, 26 link the switch to the server. The MAC addresses designated "A" and "B" are different for each of the NICs associated with the links 18, 26. Software drivers 16 control the flow of data to and from the server through these links. Using multiple network interfaces may result in a complex system configuration. Trunking minimizes this complexity by presenting the server as a single entity to the clients in the network. In an ideal trunking configuration, multiple interfaces in the server are also presented to the server as a single interface.

A server typically has three levels of addressing. The first level is a Name, often an ASCII string such as "Server1." The second addressing level is the Network Address, for example, an IP address such as "111.22.33.44." The third level is the MAC address. Different levels of software in the client identify the server by these different addresses.

Typically, a higher level address is mapped to a single instance of the address at the next level down. For example, a Name maps to a single IP address which maps to a single MAC address. In applications that employ trunking, multiple instances of addressing to the next level down are implemented. These multiple instances must be mapped into a single upper layer address. This mapping function is performed by the network protocols 14. For example, if a client has the name of the server to which it is to be connected but does not have the IP server's address, it invokes an address resolution protocol to determine the server's IP address. Thus, one function of the protocols is to resolve a lower layer address, given the address at a next layer up. These protocols are typically request/reply protocols.

Trunking involves identifying a portion in the client-to-server communication process where a mapping may be performed to allow a single server to use multiple network interfaces. This mapping may be performed at either of two points during the client-to-server communication process by using address resolution protocols. For example, Server Name to Network Level Address Mapping includes Domain Name Services (DNS) and NetBIOS name resolution; and Network Level Address to MAC Address Mapping includes Address Resolution Protocol (ARP) and General Server Query/Nearest Server Query (GSQ/NSQ). DNS and ARP are Internet protocols, while GSQ/NSQ is a protocol of Novell, Inc.

With lower level mapping, there is more opportunity for NICs and switches to participate in the trunking process. For example, BALANCE.NLM trunking supports any third-party NIC or switch. A separate media access controller (MAC) address is used for each NIC for a single network address. BALANCE.NLM requires a high software overhead, and its fault-tolerance scheme relies on higher-layer support or dropped connections.

The BALANCE.NLM driver captures information generated during the network address to MAC address mapping process to "spoof". The term us "spoofing" refers to performing a process in a way that gives the appearance that the process was performed in a standard way, although the process was actually performed in a non-standard way. In the case of BALANCE.NLM, it appears to a client that its receiving the MAC address which maps to the server's network address. It also appears to the client that there is only one such MAC address, as is normally true. In actuality, the software spoofs the normal process by allowing multiple MAC addresses to be used.

Switch/NIC coordination schemes do not support third-party NICs or switches. A low level of software overhead is required for the driver in the outbound (sending) direction.

No software is required in the inbound (receiving) direction. The server selects an output link via a simple function on the destination address. The switch selects the trunk link to the server based upon the same function on the source address. Connectivity is not lost if the link in the trunk fails. In such scheme, the same MAC address is used for all NICs. Thus, the NIC driver-to-switch protocol can be designed to permit auto-configuration.

Another trunking scheme uses a switch as a NIC card, or implements a switch in software using multiple NIC cards. In this scheme, there is a single MAC address for server identification of clients. The network operating system treats the switch as a NIC. The correct output link for delivery of traffic to clients is resolved by the switch card. This scheme requires either switching NICs, or requires significant server overhead. In such scheme, a spanning tree configuration is used to provide fault tolerance in case of failover. A switch address mapping scheme may be used to reduce software overhead. Such scheme supports third-party NICs. A switch software module is required to communicate to the switch. The switch actively participates in the address resolution process and performs load balancing by answering a client request with an address that should assist in load balancing. Additionally, the server driver must perform load balancing based upon the load or destination address.

However, the prior art methods for installing multiple NICs into a server are difficult to design and are subject to various problems arising from the complicated software and hardware configurations required. For example, higher-level mapping schemes such as BALANCE.NLM require a higher-intelligence-level driver. Furthermore, the BALANCE.NLM fault-tolerance scheme relies on higher-layer support or dropped connections. BALANCE.NLM clients are also spoofed such that it appears that they are receiving the only MAC address which maps to the server's network address when, in actuality, multiple MAC addresses are used. This can create a confusing representation of the server for the client.

Typically, when multiple NICs are installed into standard Novell, Inc. or Microsoft NT servers, each NIC has a unique MAC address. This unique MAC address maps to a unique IP or IPX network address which then maps to a server name. A server that has two NICs also has two names and two network addresses. This is complex and potentially confusing to the network administrator. If one of the NICs fails, all clients connected to the server via that NIC are disconnected. The clients must have the name and network address of the other NIC to reestablish a connection. This may require a different network path to the other NIC. Additionally, the use of such multiple names and addresses for a single server can impair, or even prevent, fault tolerance.

When multiple NICs are installed in a server, a special layer of software is required in the server to give the multiple NICs the appearance of a single NIC to the server network software. The multiple NICs, however, do not appear as a single NIC to the clients because each NIC has its unique MAC address. These unique MAC addresses are provided to the client and switches.

Using a switch as a NIC card, or switching in software requires redundancy protocols (e.g. spanning trees) and increases costs. The switch mapping support trunking scheme requires a high level of intelligence in the switch. Additionally, the prior art schemes may require special hardware support on the server side, as well as a higher-intelligence-level server.

It would therefore be an advantage to provide a method and system for supporting multiple NICs in a server, where such NICs are viewed as a single NIC to both clients and the higher layers of the internal server software. It would be yet another advantage if such method and system supported fault tolerance. It would be a further advantage if such method and system increased bandwidth without requiring any reconfiguration of the server.

SUMMARY OF THE INVENTION

The invention provides a method and system for trunking multiple links between a switch and a server. One feature that distinguishes the invention from the prior art is the combination of switch hardware and server driver software. The invention provides both a trunking system and a failover system having active switch participation with the server NIC driver during load balancing.

In the invention, additional NICs or multi-port NICs are installed into a server. The drivers in the server recognize the additional NICs and automatically configure each additional NIC to be a member of a group that may include NICs that are already installed in the server. No additional reconfiguration of the server is required to add the additional NICs. A thin layer of software, referred to as the "driver shim," overlays the drivers to make the group of NICs appear as a single NIC to the network operating system and to the clients in the network.

The invention supports multiple NICs having the same MAC address by appearing on different ports. The NICs in the group are connected directly to a switch which recognizes the group as a single logical port, i.e. trunk. The NICs in the group function as multiple links to balance the traffic load to the clients. Each NIC uses the same MAC address for the network interface.

The driver and the switch examine the MAC address fields to select a link. When traffic from a client arrives at the server, the switch executes a deterministic algorithm on the data packet transmitting the traffic. Upon receiving a packet, the switch identifies the destination address in the address 3, table. The corresponding entry returns a list of possible ports which can be used to reach the server and a flag which indicates that the server is to be reached via this trunked group of ports. The switch then selects a port in this group based upon the source address in the packet. The algorithm looks at the source address in the packet and selects one of the links in the group.

The driver in the server performs the same deterministic algorithm on the trunk to the clients, but on the destination addresses. The server software, including the driver shim, gives the group of NICs the appearance of as a single NIC and performs load balancing based upon the destination address. In an alternative embodiment of the invention, a monolithic driver specific to a vendor's NIC is used to give the group of NICs the appearance of a single NIC.

The preferred embodiment of the invention supports a fault tolerance feature. In a first preferred embodiment of the invention, a single switch is connected to a server via multiple NIC links. The links to the server are configured as a trunk in which the load balancing algorithm uses the source address of the clients to select a link.

The multiple NICs in the server program their MAC addresses to be the same on all interfaces. Therefore, the same MAC address that is used as the server's source address is provided to the switch for the multiple NIC ports. When a client sends a packet via a hub to the server, the switch selects one of the multiple ports by looking at the client's MAC address.

In a second embodiment of the invention, the server is connected via multiple NIC links to a plurality of switches. A switch-to-switch link directly connects the switches together. A client can send a packet to the server via either path of the tree. However, it is preferable for a client to use the same path for a particular data communication. The invention may be implemented using any number of switches or links supported by the network and server.

In a generic, prior art IEEE 802.ID bridge, a switch looks up a destination MAC address in the address table to find the appropriate output port for a packet. This table is created by the learning process of looking at the source MAC addresses in received packets. When a switch receives a packet on a particular port, it can assume that the host which sent the packet can also receive packets from that port. The switch notes the input port for a received packet and then updates the address table with this information.

If the address table already contains an entry for the source MAC address, the port in the address table and the port by which the packet was received should be the same. If the ports are not the same, then the MAC address is presumed to have moved. This move indication creates a move condition which is identified by the software that manages the address table. The address table should be updated with the new port to which the MAC address is assumed to have moved.

For a switch which supports trunking, it is possible that the same source MAC address is identified for packets received from any number of ports in the group. It is not desirable to create a move condition, or to update the address table continually. When multiple NICs in a server are attached to a network and these NICs use the same MAC address, it is possible to receive packets with this MAC address as the source MAC address on many ports. Therefore, the invention provides a scheme that mitigates the effect of the switch-to-switch link on the return of such packets from the server to the client, and that substantially prevents interruptions in the server caused thereby.

In this scheme, the switch is allowed to ignore the move interrupt even if the port where the address has been seen is not in the group of trunk ports. A flag for the server's MAC is included in the switch's address table. The flag notifies the switch that it is acceptable to see the server's MAC address appearing on several ports. The switch is directed not to notify the system operator that the address has moved.

DETAILED DESCRIPTION OF THE INVENTION

The invention provides a method and system for trunking multiple links between a switch and a server. One feature that distinguishes the invention from the prior art is the combination of switch hardware and server driver software. The invention provides both a trunking system and a failover system having active switch participation with the server NIC driver during load balancing.

Figure 1:
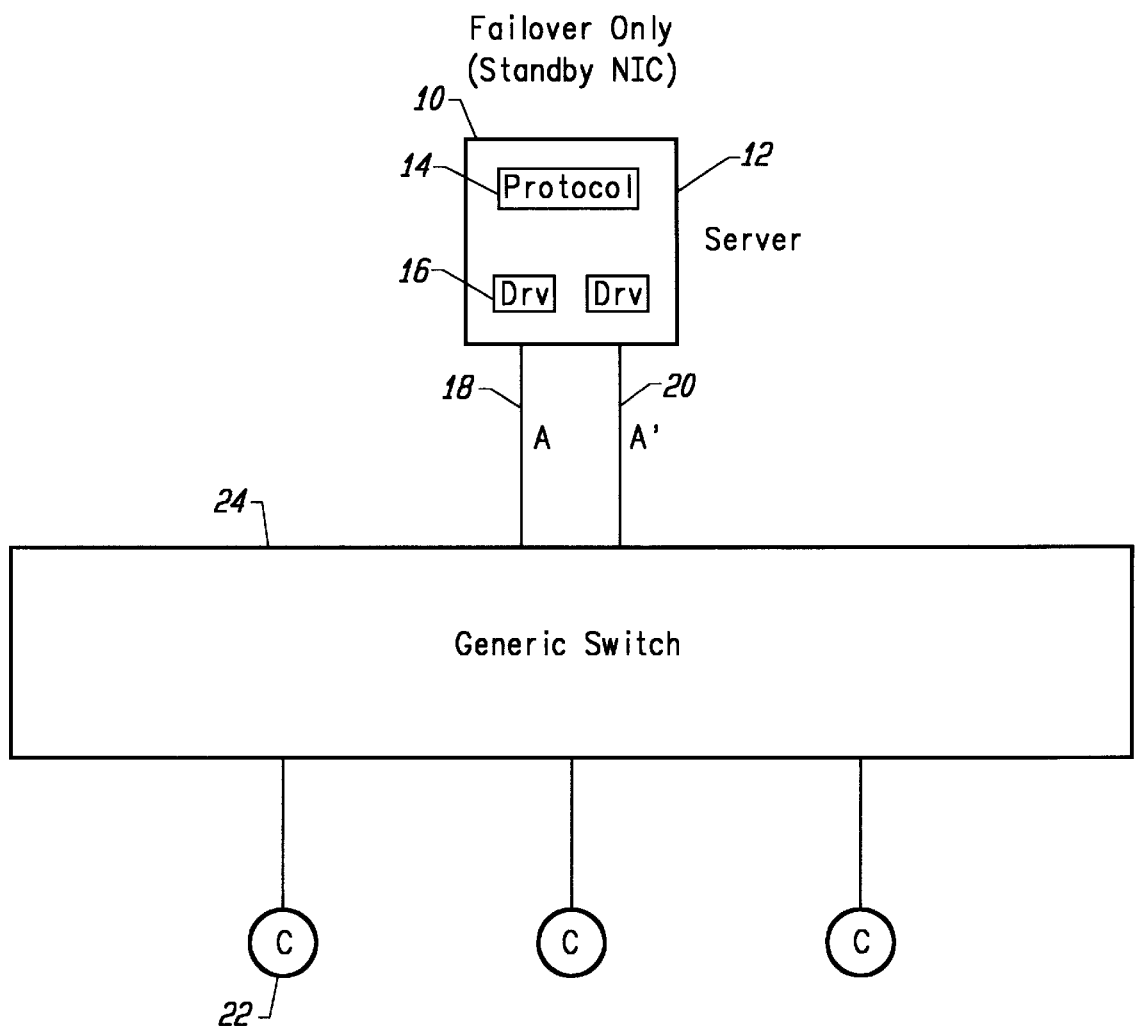
FIG. 1 is a schematic diagram of a failover system according to the prior art.
Figure 2:
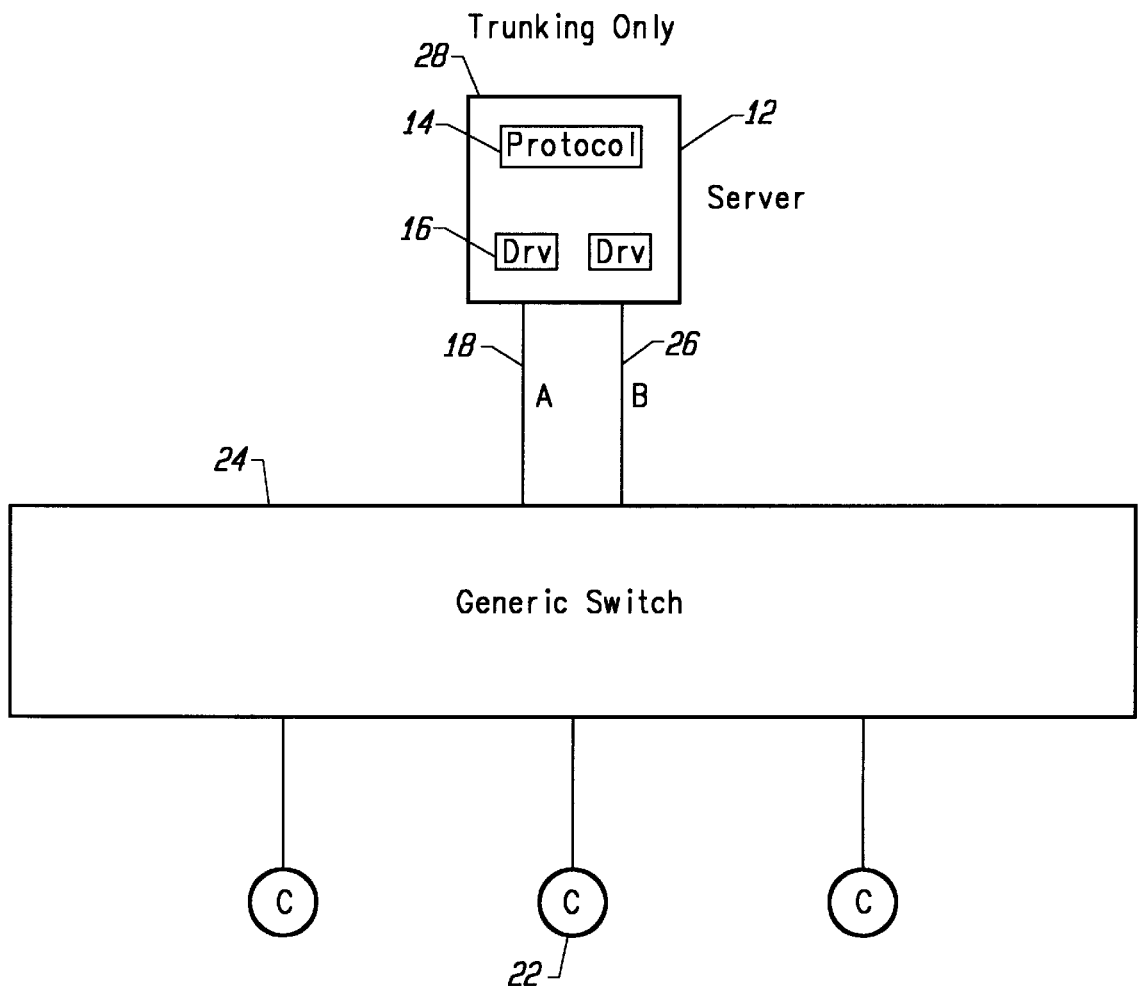
FIG. 2 is a schematic diagram of a trunking system according to the prior art.
Figure 3:
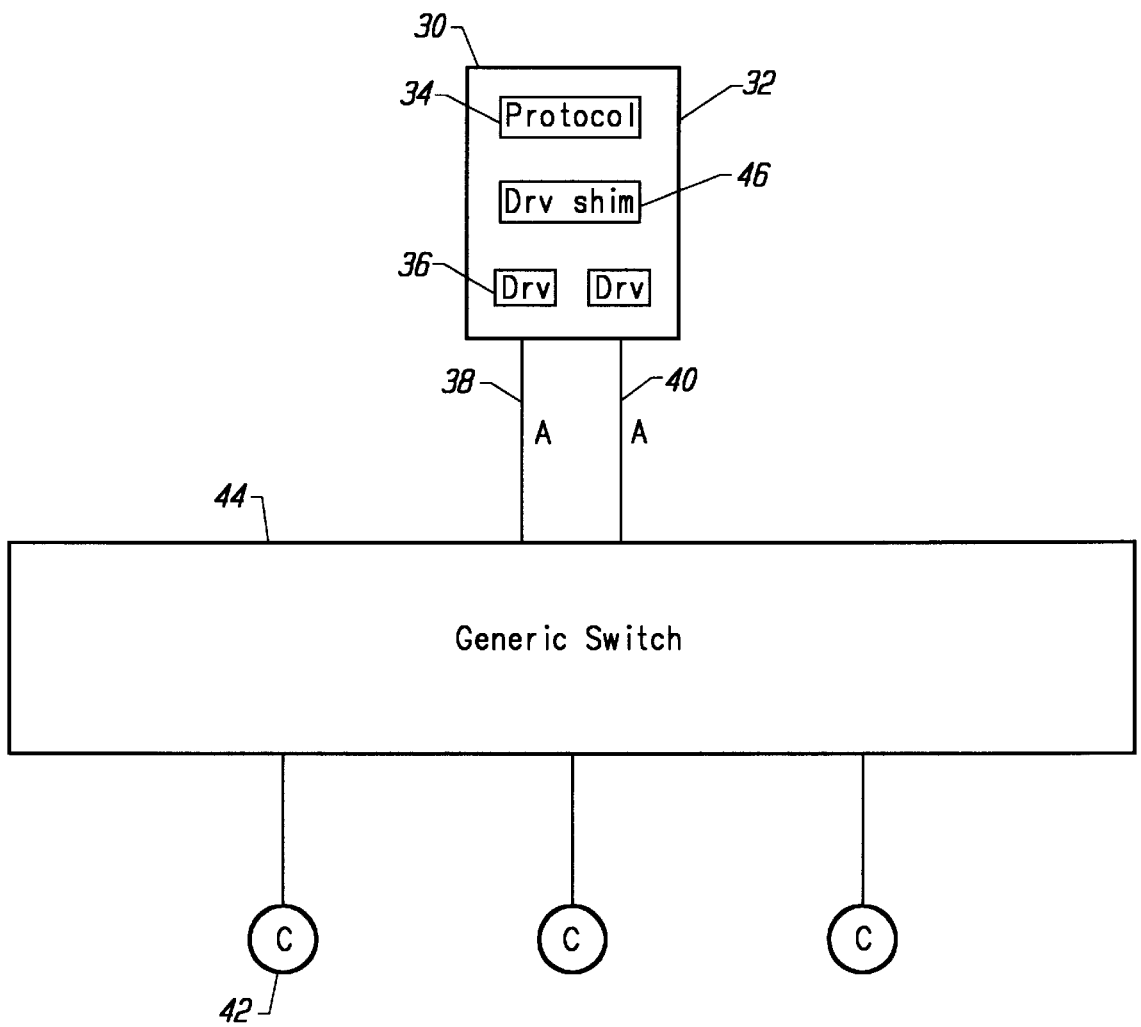
FIG. 3 is a schematic diagram of a trunking and failover system with switch participation according to the invention.

FIG. 3 is a schematic diagram of a trunking and failover system 30 having switch participation according to the invention. In the invention, additional links 38, 40 are provided for which NICs or multi-port NICs are installed in a server 32. A multiport NIC is a NIC that has multiple network attachments. The number of NICs in a system is limited by the number of slots in the server and the number of ports on the switch. A multiport NIC offers the advantage of using fewer server bay slots to provide multiple attachments to the network. No additional hardware or software configuration is required to use such multiport NICs.

The drivers 36 in the server recognize the additional NICs and automatically configure each additional NIC to be a member of a group that may include NICs that are already installed in the server. A thin layer of software, referred to as the "driver shim" 46, overlays the drivers 36. The driver shim gives the group of NICs the appearance of a single NIC to the network operating system (NOS). Additionally, the group appears as a single NIC to the clients 42 in the network.

When a client attempts to resolve the MAC address for the server's single network address, it always receives the same MAC address in any scheme. In the prior art schemes discussed above, the client may receive a different MAC address. If a NIC having one of these different MAC addresses fails, all client connections to the server via that NIC also fails. The client must then relearn the network address to MAC address mapping. This is not necessary in the invention because the same MAC address is used on all of the NICs.

The NICs in the group are connected directly to a switch 44 which treats the group as a single logical port, i.e. trunk. This configuration requires the server to be directly attached to the switch. The NICs in the group function as multiple links to balance the traffic load to the clients.

Switches generally make switching decisions based upon the destination address of a data packet. However, each NIC in the invention uses the same MAC address for the network interface. The MAC interface is the interface between the network attachment (NIC) and the computer by which information is transmitted and received on the network. The MAC implements a protocol which attaches the computer to the network. The MAC interface provides the NIC with a mechanism for transferring information into and out of the MAC. The MAC interface is described in IEEE document 802.2, incorporated by reference as a part of this application.

The invention supports multiple NICs that have the same MAC address but that appear on different ports. In the invention, a switch implements a deterministic algorithm (discussed below) that forwards packets to an address on the trunk links. When a client sends a packet to the server, the destination MAC address in the packet is the server's address and the source address is the client's address. Upon receiving the packet, the switch looks up the destination address in the address table. Because the destination MAC address is that of the server, an entry for the server exists in the table. This entry returns a list of possible ports which can be used to reach the server and a flag which indicates that the server may be reached via this trunked group of ports. The switch then selects a port in this group based upon the source address in the packet.

The flag directs the switch to a table of N entries, where N is a power of two, up to a maximum size of $N=2^M=2^{48}$. The table typically contains $2^5$ entries. The source MAC address of the packet is used to calculate an index into this table. The lowest M bits of the source MAC address are used to calculate an entry into the table. Because $2^M=N$, the lowest M bits are taken as a direct index into the table. The entry in the table is the port number to which the packet is forwarded.

As an example, if the table contains 32 entries, then M=5. If there are four ports, (ports 1–4) trunked to the server, the table of 32 entries has the numbers 1–4 evenly distributed as entries in the table. The numbers may be distributed throughout the table in any acceptable way. When a packet is received for the server MAC address which is reachable by one of these ports, the lowest five bits in the client's MAC address are used to index directly into the table. The port number found at the table index is the port to which the packet is forwarded.

On the trunk to the clients, the driver 36 in the server performs the same deterministic algorithm, but on the destination addresses. The server software, including the driver shim, give the group of NICs the appearance of a single NIC, and performs load balancing based upon the destination address in accordance with the server protocol 34.

The algorithm is executed by the driver shim to select one port in the trunk group within the switch for packets addressed to the server. The low order bits in the destination MAC address are used to index into the table. This is one significant consideration for transmitting packets. When receiving packets, the server driver only accepts broadcast packets on one of the links. Broadcast packets received on any other NICs in the group are discarded.

The driver and the switch are not required to perform complex packet analysis to select a link. Rather, the driver and the switch examine the MAC address fields. These fields are at a fixed offset within the packet from the beginning of the packet. For example, the format of an Ethernet packet is:

TABLE 1

| DA | SA | Type/Len | Data |
| --- | --- | --- | --- | where:
DA = destination MAC address (48 bits)
SA = source MAC address (48 bits)
Type/len = Packet length or Ethertype (16 bits)

Figure 4:
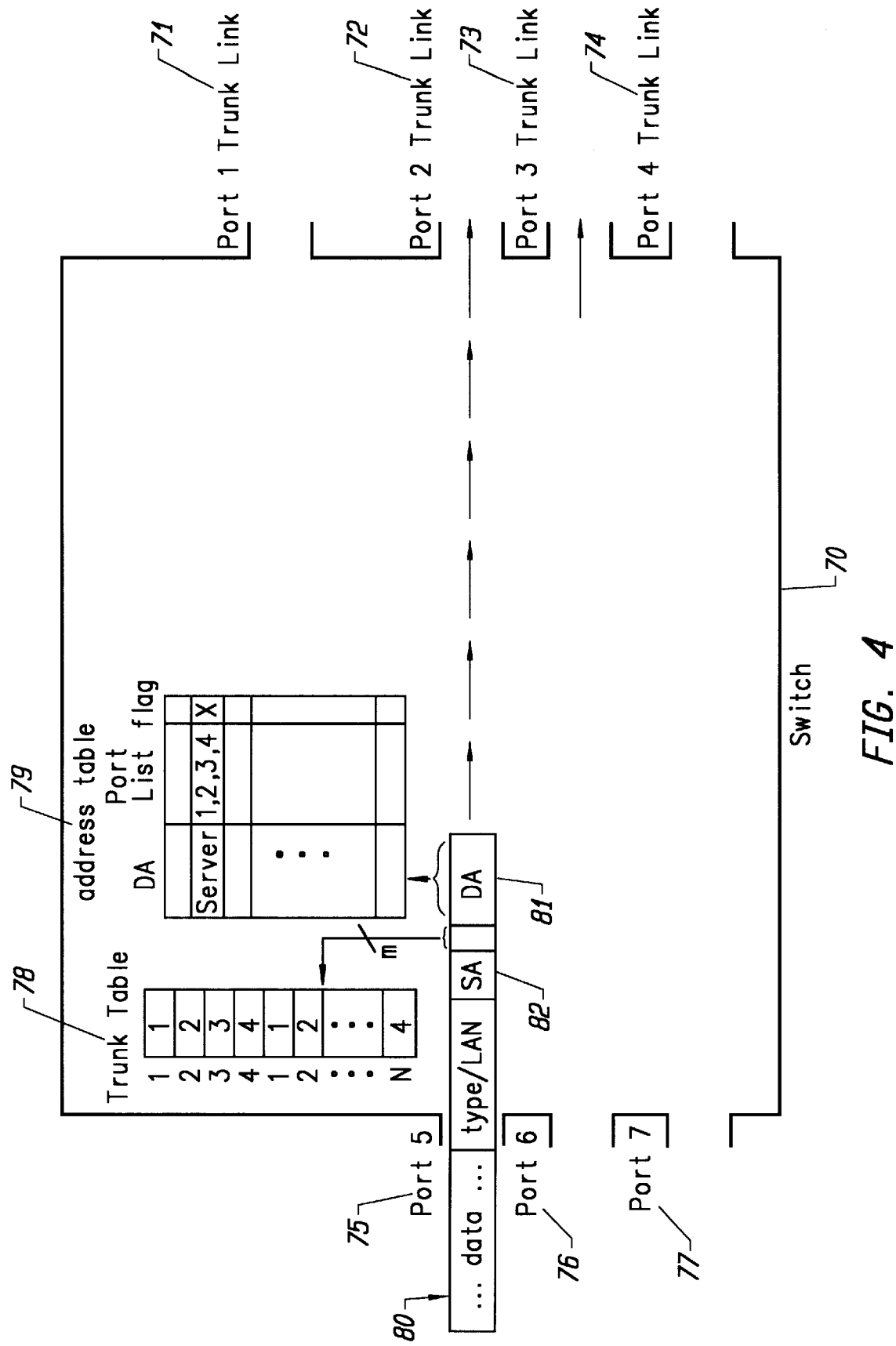
FIG. 4 is a schematic diagram of a switch that includes a link level trunking system according to the invention.

FIG. 4 is a schematic diagram of a switch that includes a link level trunking system according to the invention. A standard switch 70 forwards packets received on input ports 75–77 to an appropriate output port 71–74. When a packet 80 is received by the switch, the switch examines the DA field 81 in the packet in order to forward the packet. The switch holds an address table 79 which contains a list of MAC addresses and the ports by which they can be reached. The switch looks up the DA in the address table to find the destination output port. If the DA is not found, the switch floods the packet to all output ports. If the DA is found, the switch sends the packet only to the port listed in the table.

In the invention, the address table also contains a flag which indicates that the DA is reachable by multiple output ports, rather than just one port. These multiple output ports are the trunk group (discussed above). The flag also directs the switch to the table of N entries (described above). The switch looks at the SA 82 to find an index in the trunk table 78 and thereby select the appropriate output port.

A particular source and destination MAC address pair always use the same link in the group, in accordance with bridging standards, such as the IEEE 802.ID standard. This standard indicates that packet order must be preserved by a switch. Always selecting the same link for a given SA/DA pair guarantees such packet order.

The prior art methods for installing multiple NICs into a server require complex software and hardware configurations. Higher-level mapping schemes, such as BALANCE.NLM require a higher-intelligence-level driver. The use of multiple NIC addresses can create a confusing representation of the server to the client and may require the client to have the name and network address of other NICs in the event it is necessary to reestablish a dropped connection. The use of such multiple names and addresses for a single server can impair, or even prevent, fault tolerance.

By contrast, the invention performs a mapping between multiple NICs and a network address by coordinating the operation of a switch with software in the server. The NICs all have the same MAC address and are active on the network at the same time. This is typically an impossible or illegal situation in the prior art. The invention functions because the switch is aware of the situation and hides any problems associated therewith from the clients.

For example, the invention eliminates the need to create two network names and use two network addresses when using two NICs in a server. To the clients, the server has only one name and one network address. Thus, if one of the NICs fails, there is no need to reestablish a new connection to the server. The switch hides the network failure from the clients.

The invention is more advantageous than the prior art higher level mapping schemes because there is a single mapping from Name to network address to MAC address. Additionally, the invention requires lower server overhead.

The invention is also an improvement over prior art schemes that use a switch as a NIC or that switch in software, e.g. the invention does not require redundancy protocols, such as spanning trees, and is lower in cost than such switch NICs. Furthermore, the invention requires less intelligence in the switch than the hybrid approach, and does not require special hardware support on the server side.

Figure 5:
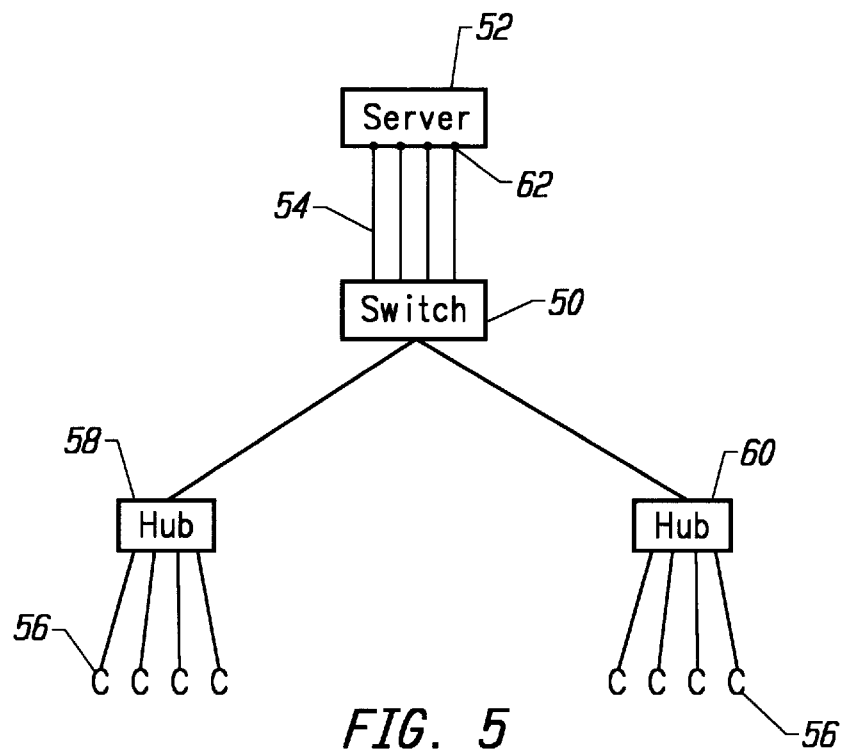
FIG. 5 is a schematic diagram of the link level server/switch trunking system according to a first preferred embodiment of the invention.

The preferred embodiment of the invention supports a fault tolerance feature. FIG. 5 is a schematic diagram of the link level server/switch trunking system according to a first preferred embodiment of the invention. In FIG. 5, a single switch 50 is connected to a server 52 via multiple links 54. The links to the server are configured as a trunk in which the load balancing algorithm uses the source address of the clients 56 to select a link.

Multiple NICs in the server program their MAC addresses such that they are the same on all interfaces. Therefore, the same MAC address used for the server's source is applied to multiple ports 62. When a client sends a packet via a hub 58, 60 to the server, the switch selects one of the multiple ports by examining the client's MAC address.

Figure 6:
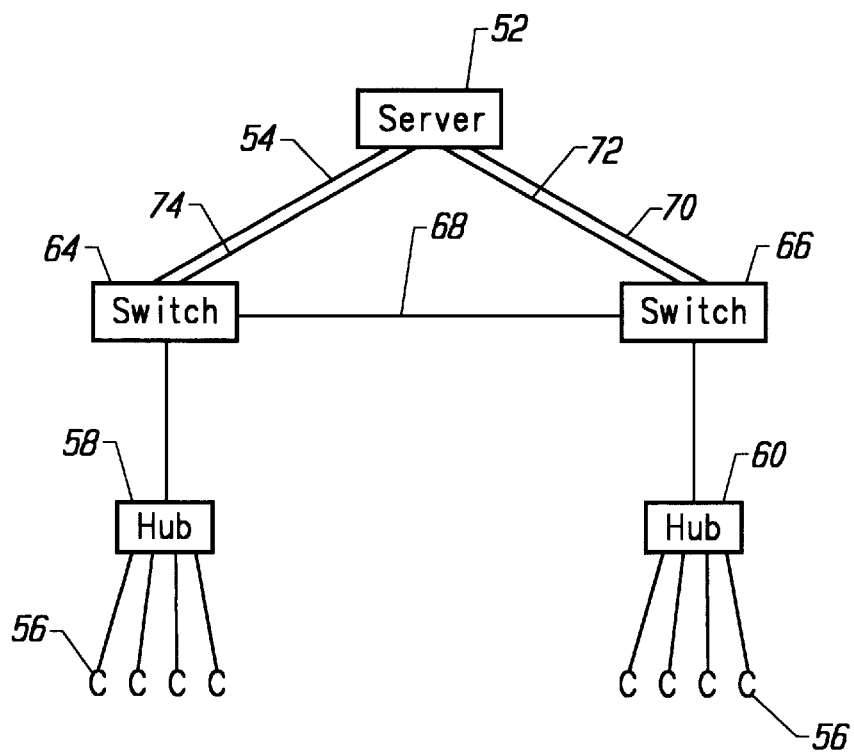
FIG. 6 is a schematic diagram of the link level server/switch trunking system according to a second embodiment of the invention.

FIG. 6 is a schematic diagram of the link level server/switch trunking system according to a second embodiment of the invention. In this embodiment, the server 52 is connected via multiple links 54, 74 to a switch 64, and via multiple links 70, 72 to a switch 66. A switch-to-switch link 68 connects the switches 64 and 66. Switch 64 is joined to a hub 60 and the switch 66 is joined to a hub 58, respectively. The hubs then connect to the clients 56. While FIG. 6 shows the server connected to two switches, one skilled in the art will readily appreciate that the invention may be implemented using any number of switches or links supported by the network and server.

Traffic from a client that travels through the nearest switch to the server may be routed to the correct links using the link selection scheme described above. However, in this system, packets having the server's source address may cross the switch-to-switch link. This switch-to-switch link is not included in the server trunk group.

For a switch which supports trunking, it is possible to have the same source MAC address on packets received from any number of ports in the group. It is not desirable to create a move condition, or to update the address table continually. When multiple NICs in a server are attached to a network and the NICs are using the same MAC address, it is possible to receive packets with this MAC address as the source MAC address on many ports. The invention therefore also provides a scheme that mitigates the effect of the switch-to-switch link on the return of such packets from the server to the client, and that prevents interruptions in operation of the server caused thereby.

In this scheme, the switch is allowed to ignore the move condition even if the port where the address is seen is not in the group of trunk ports. A flag for the server's MAC is included in the switch's address table. The flag notifies the switch that it is acceptable for the server's MAC address to appear on several ports. The server is directed not to notify the system operator that the address has moved. It will be readily apparent to one skilled in the art that other schemes, or combinations of the schemes discussed above, may be implemented to facilitate the server-to-client transmission of traffic that has crossed the switch-to-switch link.

Although the invention is described herein with reference to the preferred embodiment, one skilled in the art will readily appreciate that other applications may be substituted for those set forth herein without departing from the spirit and scope of the present invention.

The server driver, driver shim, and protocol software are readily generated by one skilled in the art using well-known programming techniques.

The switch hardware is similarly configured by one skilled in the art.

The invention is also adapted for use with a vendor-specific monolithic driver. Such driver is specific to the vendor's NIC.

Accordingly, the invention should only be limited by the claims included below.

What is claimed is:

1. In a computer network, a method for trunking multiple links between a switch and a server, the server having either of additional network interface cards (NICs) and multi-port NICs installed therein, the method comprising the steps of:

recognizing and configuring said additional NICs or multi-port NICs as members of a group;

making said group appear to be a single NIC to said server's operating system and clients;

treating said group as a trunk having multiple ports;

selecting, from a source address of a packet received at said switch, one of said ports to reach said server; and selecting, from a destination address of a packet sent from said server, one of said ports to reach a one of said clients.

2. The method of claim 1, wherein said recognizing and configuring step is performed by a server driver.

3. The method of claim 2, wherein said step of making said group appear to be a single NIC is one of a driver shim overlaying at least one of said server drivers, or a monolithic driver.

4. The method of claim 1, further comprising the step of one or more of said NICs in said server programming their MAC address to be the same on all interfaces.

5. The method of claim 1, wherein said step of treating said group as a trunk is performed by a switch connected to said group.

6. The method of claim 1, wherein said step of selecting a port to reach said server further comprises the step of said switch performing a deterministic algorithm on said packet.

7. The method of claim 6, wherein said step of performing said deterministic algorithm further comprises the steps of:

said switch looking up the destination address of said server packet in an address table of said switch;

returning to said switch a flag indicating said server is to be reached via said multiple ports;

said flag directing said switch to a table containing the numbers of each of said multiple ports distributed therein as entries;

said switch indexing into said table, wherein the lowest M bits of a source MAC address of said packet are used to calculate an index;

said switch selecting one of said ports based upon said entry found at said index.

8. The method of claim 1, wherein said step of selecting a port to reach said client further comprises the steps of:

a server driver indexing into a table containing the numbers of said multiple ports distributed therein as entries, wherein the lowest M bits of a destination MAC address of said packet are used to calculate an index;

said server driver selecting one of said ports based upon said entry found at said index.

9. The method of claim 1, further comprising the step of mitigating the effects of a same source MAC address appearing on packets received from said multiple ports and preventing resulting interruptions in said switch.

10. The method of claim 9, wherein said mitigating step comprises the steps of:

notifying said switch that it is acceptable to see said server's source MAC address appearing on said multiple ports; and directing said switch not to notify said network's system operator thereof.

11. The method of claim 1, further comprising the step of providing fault tolerance.

12. The method of claim 11, wherein said fault tolerance step comprises the steps of:

the switch seeing a MAC address used as said server's source on multiple NIC ports; and the switch selecting one of said multiple ports by looking at said client's MAC address;

wherein data communication between said server and said client is maintained in the event of a disruption in a link to said ports.

13. The method of claim 11, wherein said fault tolerance step comprises the steps of:

connecting said server via multiple NIC links to a plurality of switches, in a hubbed tree structure; and connecting said switches together with a switch-to-switch link to create a plurality of paths in said tree, such that a packet may be communicated over any of said paths;

wherein data communication between said server and said client is maintained in the event of a disruption in one of said links to said ports.

14. In a computer network, a method for trunking multiple links between a switch and a server having either of additional network interface cards (NICs) and multi-port NICs installed therein, comprising the steps of:

a server driver recognizing and configuring said additional NICs or multi-port NICs as members of a group;

making said group appear to be a single NIC to said server's operating system and clients using one of a monolithic driver, or a driver shim overlaying at least one of said server drivers;

a switch connected to said group treating said group as a trunk having multiple ports;

providing fault tolerance;

selecting, from a source address of a packet received at said switch, one of said ports to reach said server;

selecting, from a destination address of a packet sent from said server, one of said ports to reach a one of said clients;

notifying said switch that it is acceptable to see said server's source MAC address appearing on said multiple ports; and directing said switch not to notify said network's system operator thereof.

15. The method of claim 14, wherein said step of providing fault tolerance comprises the steps of:
   the switch seeing a MAC address used as said server's source on multiple NIC ports; and
   the switch selecting one of said multiple ports by looking at said client's MAC address;
wherein data communication between said server and said client is maintained in the event of a disruption in a link to said ports.

16. The method of claim 14, wherein said step of providing fault tolerance comprises the steps of:
   connecting said server via multiple NIC links to a plurality of switches, in a hubbed tree structure; and
   connecting said switches together with a switch-to-switch link to create a plurality of paths in said tree, such that a packet may be communicated over any of said paths;
wherein data communication between said server and said client is maintained in the event of a disruption in one of said links to said ports.

17. A system, in a computer network, for trunking multiple links between a switch and a server, comprising:
   means for recognizing and configuring either of additional network interface cards (NICs) or multi-port NICs as members of a group;
   means for making said group appear to be a single NIC to said server's operating system and clients;
   means for treating said group as a trunk having multiple ports;
   means for selecting, from a source address of a packet received at said switch, one of said ports to reach said server; and
   means for selecting, from a destination address of a packet sent from said server, one of said ports to reach a one of said clients.

18. The system of claim 17, wherein said recognizing and configuring means is a server driver.

19. The system of claim 17, wherein said means for making said group appear to be a single NIC is one of a driver shim overlaying at least one server driver or a monolithic driver.

20. The system of claim 17, further comprising multiple NICs in said server whose MAC addresses are programmed to be the same on all interfaces.

21. The system of claim 17, wherein said means for treating said group as a trunk and said means for selecting a port to reach said server is one switch connected to said server via multiple NICs in said group.

22. The system of claim 17, wherein said means for treating said group as a trunk and said means for selecting a port to reach said server is a plurality of NIC links to a plurality of switches.

23. The system of claim 17, further comprising means to mitigate the effects of a same source MAC address appearing on packets received from said multiple ports and to prevent resulting interruptions in said switch.

24. The system of claim 23, wherein said mitigating means comprises:
   means for notifying said switch that it is acceptable to see said server's MAC address appearing on said multiple ports; and
   means for directing said switch not to notify said network's system operator thereof.

25. The system of claim 17, further comprising means for providing fault tolerance.

26. The system of claim 25, wherein said fault tolerance means comprises:
   means for said switch to see a MAC address used as said server's source on multiple NIC ports; and
   means for said switch to select one of said multiple ports by looking at said client's MAC address;
wherein data communication between said server and said client is maintained in the event of a disruption in a data link to one of said ports.

27. The system of claim 25, wherein said fault tolerance means comprises:
   multiple NIC links for connecting said server to a plurality of switches, in a hubbed tree structure; and
   at least one switch-to-switch link connecting said switches together to create a plurality of paths in said tree, such that a packet may be communicated over any of said paths;
wherein data communication between said server and said client is maintained in the event of a disruption in one of said links to said ports.

28. In a computer network, a method for trunking multiple links between a switch and a network node, the network node having either of additional network interface cards (NICs) and multi-port NICs installed therein, the method comprising the steps of:
   recognizing and configuring said additional NICs or multi-port NICs as members of a group;
   making said group appear to be a single NIC to constituents of said network node; and
   treating said group as a trunk having multiple ports.

29. The method of claim 28, further comprising the steps of:
   selecting, from a source address of a packet received at said switch, one of said ports to reach said network node; and
   selecting, from a destination address of a packet sent from said network node, one of said ports to reach a client.

30. A system, in a computer network, for trunking multiple links between a switch and a network node, comprising:
   means for recognizing and configuring either of additional network interface cards (NICs) or multi-port NICs as members of a group;
   means for making said group appear to be a single NIC to constituents of said network nod; and
   means for treating said group as a trunk having multiple ports.

31. The system of claim 30, further comprising:
   means for selecting, from a source address of a packet received at said switch, one of said ports to reach said network node; and
   means for selecting, from a destination address of a packet sent from said network node, one of said ports to reach a client.

* * * * *